US005570838A

United States Patent [19]
Davis, Jr. et al.

[11] Patent Number: 5,570,838
[45] Date of Patent: Nov. 5, 1996

[54] METHOD AND CONTROL SYSTEM FOR CONTROLLING AN AUTOMOTIVE HVAC SYSTEM FOR INCREASED OCCUPANT COMFORT

[75] Inventors: Leighton I. Davis, Jr.; Robert W. Matteson, both of Ann Arbor; Gerhard A. Dage, Franklin, all of Mich.

[73] Assignee: Ford Motor Company, Dearborn, Mich.

[21] Appl. No.: 363,076

[22] Filed: Dec. 23, 1994

Related U.S. Application Data

[63] Continuation-in-part of Ser. No. 83,757, Jun. 30, 1993, Pat. No. 5,427,313, and a continuation of Ser. No. 83,587, Jun. 30, 1993, and a continuation of Ser. No. 83,589, Jun. 30, 1993, and a continuation of Ser. No. 83,756, Jun. 30, 1993.

[51] Int. Cl.$^6$ .................................................. B60H 1/00
[52] U.S. Cl. .................... 236/49.3; 236/44 C; 236/91 C; 454/75; 454/258
[58] Field of Search .................... 62/176.1, 176.6, 62/186, 177, 178, 179, 180; 165/16, 21; 236/49.3, 44 R, 44 A, 44 C, 91 R, 91 C; 454/75, 256, 258, 229

[56] References Cited

U.S. PATENT DOCUMENTS

| | | | |
|---|---|---|---|
| 4,340,112 | 7/1982 | Sutoh et al. | 165/16 |
| 4,350,286 | 9/1982 | Sutoh et al. | 236/44 A |
| 4,424,933 | 1/1984 | Sutoh et al. | 236/44 A |
| 4,448,035 | 5/1984 | Moriyama et al. | 62/176.6 |
| 4,482,007 | 11/1984 | Yoshimi et al. | 165/21 |
| 4,487,029 | 12/1984 | Hidaka et al. | 62/133 |
| 4,730,662 | 3/1988 | Kobayashi | 165/25 |
| 4,783,970 | 11/1988 | Takahashi | 62/176.3 |
| 4,848,444 | 7/1989 | Heinle et al. | 165/21 |
| 4,852,363 | 8/1989 | Kampf et al. | 62/176.6 |
| 4,895,000 | 1/1990 | Takahashi | 62/176.3 |
| 4,896,589 | 1/1990 | Takahashi | 98/2.01 |
| 4,910,967 | 3/1990 | Takahashi | 62/176.1 |
| 4,914,924 | 4/1990 | Takahashi | 236/91 C X |
| 4,920,755 | 5/1990 | Tadahiro | 62/171 |
| 5,014,519 | 5/1991 | Noji et al. | 62/176.3 |
| 5,148,977 | 9/1992 | Hibino et al. | 236/49.3 |
| 5,165,595 | 11/1992 | Horio et al. | 236/49.3 |
| 5,316,214 | 5/1994 | Suzuki et al. | 236/91 C X |

FOREIGN PATENT DOCUMENTS

| | | |
|---|---|---|
| 57-191116 | 11/1982 | Japan . |
| 63-265721 | 11/1988 | Japan . |
| 63-269718 | 11/1988 | Japan . |

*Primary Examiner*—Harry B. Tanner
*Attorney, Agent, or Firm*—Paul K. Godwin, Jr.; Roger L. May

[57] ABSTRACT

Method and control system for controlling an automotive HVAC (heating, ventilation and air conditioning) system using fuzzy logic to increase steady state comfort of an occupant in a vehicle and to decrease the time needed to reach steady state comfort. The control system responds to signals generated by various climate control sensors, including a humidity sensor, to produce a desired humidity, temperature and flow. Fuzzy logic calculations are performed based on fuzzy rules and membership functions to provide nonlinear compensation and to allow the control to be expressed in the same heuristic terms that an occupant could use in describing the level of comfort.

6 Claims, 7 Drawing Sheets

METHOD AND CONTROL SYSTEM FOR CONTROLLING AN AUTOMOTIVE HVAC SYSTEM FOR INCREASED OCCUPANT COMFORT

CROSS REFERENCE TO RELATED APPLICATIONS

This application is a continuation-in-part of U.S. patent application Ser. No. 083,757 entitled "Method And Control System For Controlling An Automotive HVAC System To Prevent The Discharge Of Air Within A Predetermined Temperature Range" U.S. Pat. No. 5,427,313; U.S. Ser. No. 083,587 entitled "Method And System or Predicting Air Discharge Temperature In A Control System Which Controls An Automotive HVAC System"; U.S. Ser. No. 083,589 entitled "Method And System For Modifying A Linear Control Algorithm Which Controls An Automotive HVAC System"; and U.S. Ser. No. 083,756 entitled "Method And Control System For Controlling An Automotive HVAC System", all of which have the same inventive entity, are assigned to the same assignee and have the same filing date of Jun. 30, 1993.

This application is also related to U.S. patent applications entitled "Method And Control System For Controlling An Automotive HVAC System To Prevent Fogging" and "Method And Control System For Economically Controlling An Automotive HVAC System", both of which have the same inventive entity, are assigned to the same assignee, and have the same filing date as the present application.

TECHNICAL FIELD

This invention relates to methods and control systems for controlling an automotive HVAC system and, in particular, to methods and systems for controlling an automotive HVAC system using a humidity sensor.

BACKGROUND ART

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

In an attempt to measure and control the many variables that affect comfort, modern automotive HVAC systems have many sensors and control actuators. A typical system might have a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

It falls to the controller to sort out the range of possible conditions, determine what is needed to achieve comfort, and coordinate the control of the set of actuators available.

This multiple input, multiple output control problem does not fall into any convenient category of traditional control theory. The performance criterion, comfort, is not some well defined formula but a sometimes inconsistent goal, empirically determined. In particular, comfort control is not the same as temperature control. The response of the system as well as the relationship between system variables and desired performance, comfort, is rarely linear. Also, it is important to note that despite all the actuators and variables available for control, there may exist conditions under which comfort may not be achievable.

Due to practical considerations of size, energy consumption, cost and the wide conceivable range of conditions that automobiles are exposed to, the system plant may simply not be able to supply what is needed. All these considerations lead to a control problem that is far from what is usually encountered in traditional control theory.

In the face of these difficulties, most control system designs have used what is familiar—linear control—and supplemented it by patched-in specific responses to handle special circumstances where necessary. In other words, typical automobile automatic climate control systems use linear proportional control to maintain a comfortable interior environment. However, there are two significant limitations of linear proportional control when viewed from the standpoint of an occupant's subjective comfort: first, there are certain control situations in any HVAC system that are inherently nonlinear, and second, it is not possible to realize occupant comfort merely by maintaining proximity to a desired temperature as described in greater detail hereinbelow.

The design of a typical HVAC climate control system starts with the need to provide acceptable occupant comfort levels under the most extreme high and low ambient conditions that a vehicle might encounter. For these conditions, the control system is requesting the HVAC unit to operate at peak output in one direction or the other. Design considerations center around plant capacity and the efficiency of heat transfer in order to handle these extremes. The control system is effectively saturated until one or more of the input signals indicate that some level of comfort control is achievable.

It is at this point that the system begins to moderate its control of blower speed, the location of discharge air (mode of operation), and the relative blend of cooled and heated air. The simplest approach to control in this region is to have the control follow a straight line between the two extremes. Such a linear control algorithm adjusts the outputs in an appropriate manner and its parameters are easy to determine based on the points of onset of the two extreme regions. With a well defined HVAC system and enough developmental evaluation time, one can tune the coefficients to provide acceptable levels of comfort for a variety of operating conditions. The linear approach is quite well understood and easy to implement. For a small microprocessor-based controller, its essence is captured in a few lines of code.

The linear approach has obvious limitations when dealing with nonlinear situations. All HVAC systems behave nonlinearly in various regions of their operation. The transfer of heat as a function of blower speed is nonlinear. The onset of any plant output limitation affects desired response in a nonlinear fashion. Factors affecting plant limitations may be tracked via additional sensors—for example, engine coolant temperature (ECT) correlates with heater core temperature—but again, the relationship is nonlinear. The usual approach to handling special nonlinear situations is to use logic-based modification of the usual linear strategy when these situations are detected. Thus, in cold weather, when ECT is below a certain threshold indicating that the heater core cannot warm the cabin, the blower would be shut off.

In addition to the current difficulties, new vehicle lines create additional problems that are not easy to overcome. The reduction in interior and under hood package space in current vehicle designs has caused the transfer function for discharge temperature to be even more nonlinear, especially when operating at the extremes of ambient temperature.

The response of crisp (as opposed to fuzzy) logic in a control strategy does not fit well when human comfort is the goal. Abrupt changes in environment are not perceived favorably by most people. It is true that the effect of sudden changes occasioned by crisp logic transitions may be masked via input or output filtering. Also, some of the resulting conditions may not be experienced by the occupant as a level of discomfort. For example, heater warmup, linear or nonlinear, has no effect on comfort on a hot day with the system at maximum cooling.

FUZZY LOGIC APPROACH

As previously mentioned, the description of comfort for most people is expressed in terms that are not particularly precise. If one asks people how they describe their comfort, we get answers such as "slightly cold", "fine", or "very hot." A person's comfort can easily be phrased in such vague terms but it is more difficult to interpret these expressions quantitatively. The imprecise nature of comfort description leads to the use of fuzzy logic in specifying a strategy for comfort control. Fuzzy logic provides procedures to incorporate knowledge expressed vaguely and yet arrive at a definite, calculable answer.

Fuzzy logic is a methodology for handling knowledge that contains some uncertainty or vagueness. The foundations of fuzzy logic were set forth in the 1960s by L. A. Zadeh in his paper entitled "Fuzzy Sets", INFORM. CONTR., 8 pp. 338–353, 1965.

In current engineering application, fuzzy logic is most often found in control problems in the form of a particular procedure, called "max-min" fuzzy inference as described by Ebrahim Mamdani in his paper entitled "Application of Fuzzy Logic to Approximate Reasoning Using Linguistic Synthesis", IEEE TRANSACTIONS ON COMPUTERS, (1977) C-26, No. 12, pp. 1182–1191. This procedure incorporates approximate knowledge of appropriate control response for different circumstances into sets of rules for calculating a particular control action. The rules are expressed in terms of "IF (situation holds), THEN (take consequent control action)". The degree to which a particular consequent action is taken depends on the degree to which its corresponding conditions hold. The linguistic expression of a situation or consequent control action is translated into a definite calculation via specified membership functions. A membership function quantifies what is meant by a phrase such as "The temperature is high" by defining the degree of membership in the class, "high", depending on the value of the input variable, temperature.

U.S. Pat. No. 5,165,595 uses standard fuzzy control for a vehicle air conditioning system. Control of discharge temperature is done by means of blower speed and face duct/foot duct positioning.

U.S. Patent No. 4,920,755 discloses a control apparatus for an automobile air conditioner wherein relative humidity is calculated and is used to control a humidifier.

SUMMARY OF THE INVENTION

An object of the present invention is to provide a nonlinear method and control system for controlling an automotive HVAC system to provide improved steady state comfort level and a shortened period of time to reach such level over existing methods and control systems by being able to handle imprecision naturally as a consequence of its structure and organization.

In carrying out the above object and other objects of the present invention, a method is provided for automatically controlling a heating, ventilation and air conditioning (HVAC) system for increased comfort of an occupant in a vehicle which discharges a flow of air to a passenger cabin of the vehicle. The system includes a variable speed blower, means for varying air temperature, ducting, actuators having various control positions for controlling the direction of air flow, an intake door having control positions for controlling the ratio of fresh air to recirculated air, a humidity sensor for sensing relative humidity within the cabin, and temperature sensors for sensing temperature within the cabin, ambient temperature and an adjustable target set point temperature. The method includes the steps of determining the relative humidity; determining ambient temperature and temperature within the cabin; defining membership functions and fuzzy rules between the relative humidity, ambient temperature, and the control positions of the intake door. The method also includes the step of generating a control signal to control the position of the intake door to cause the system to discharge air into the cabin having a desired ratio of fresh air to recirculated air based on the relative humidity, ambient temperature, temperature within the cabin and the membership functions and the fuzzy rules.

Further in carrying out the above object and other objects of the present invention, a system is provided for carrying out the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
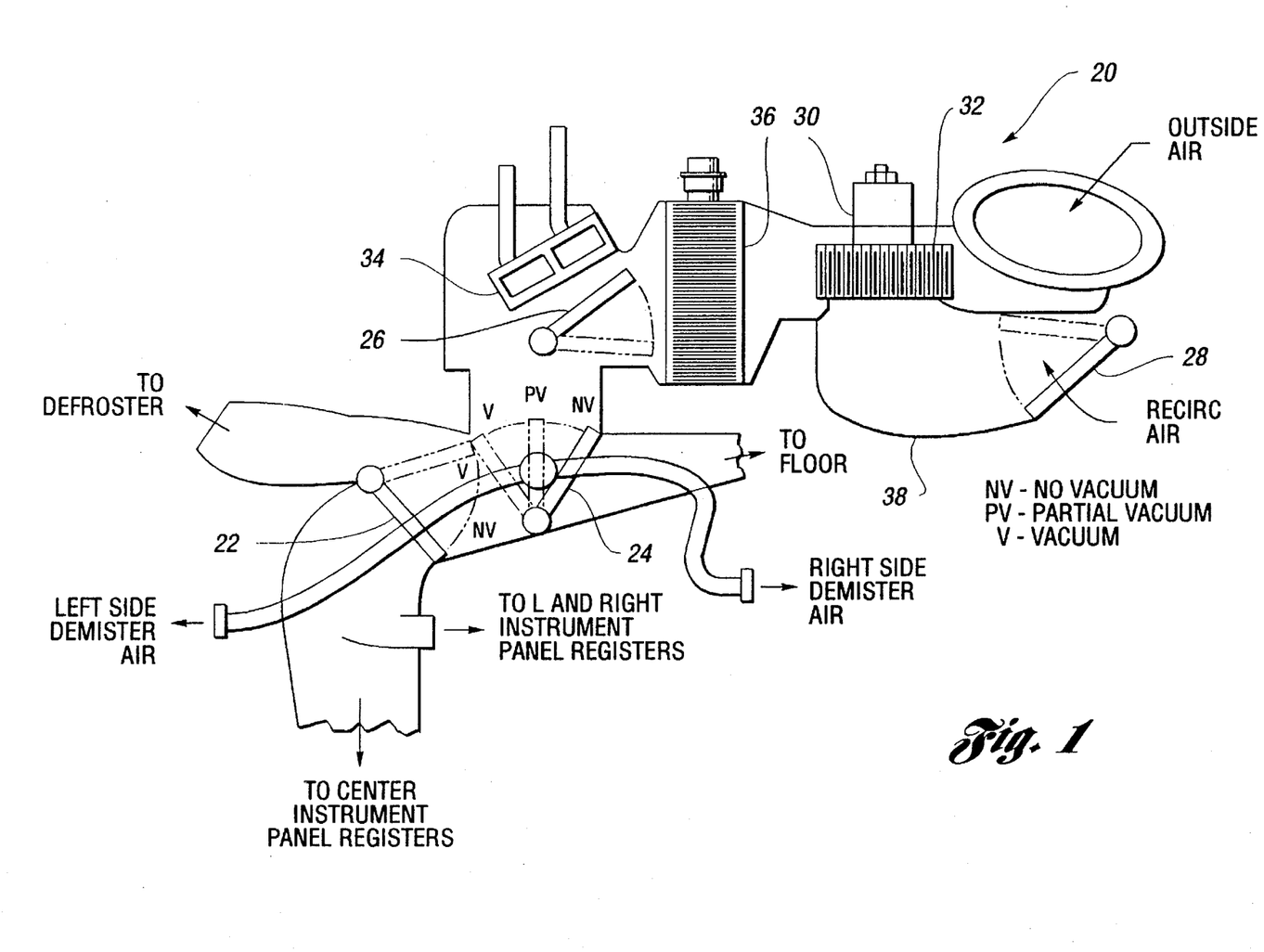
FIG. 1 is a schematic diagram illustrating an air handling system which can be controlled by the method and control system of the present invention.

In general, control of temperature and air flow (and to a lesser extent, humidity) within an automobile is accomplished using various actuators to affect the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside recirc air actuators or doors 22, 24, 26 and 28, respectively. The doors 22 and 24 are preferably driven by vacuum motors (not shown) between their various vacuum, partial vacuum and no vacuum positions in a conventional fashion as indicated in FIG. 1. The door 26 is driven by an electric servo motor also in a conventional fashion. The door 28 may also be driven by an electric servo motor so that the position of the door 28 is continuously variable.

The system 20 also includes a variable speed blower motor 30 including a blower wheel 32.

The system further includes heating and cooling elements such as a heater core 34 and an evaporator core 36 of a typical vehicle air conditioning plant. Each of the above components is connected via ducting 38 in order to control temperature, the direction of air flow and the ratio of fresh air to recirculated air to control humidity.

Figure 2:
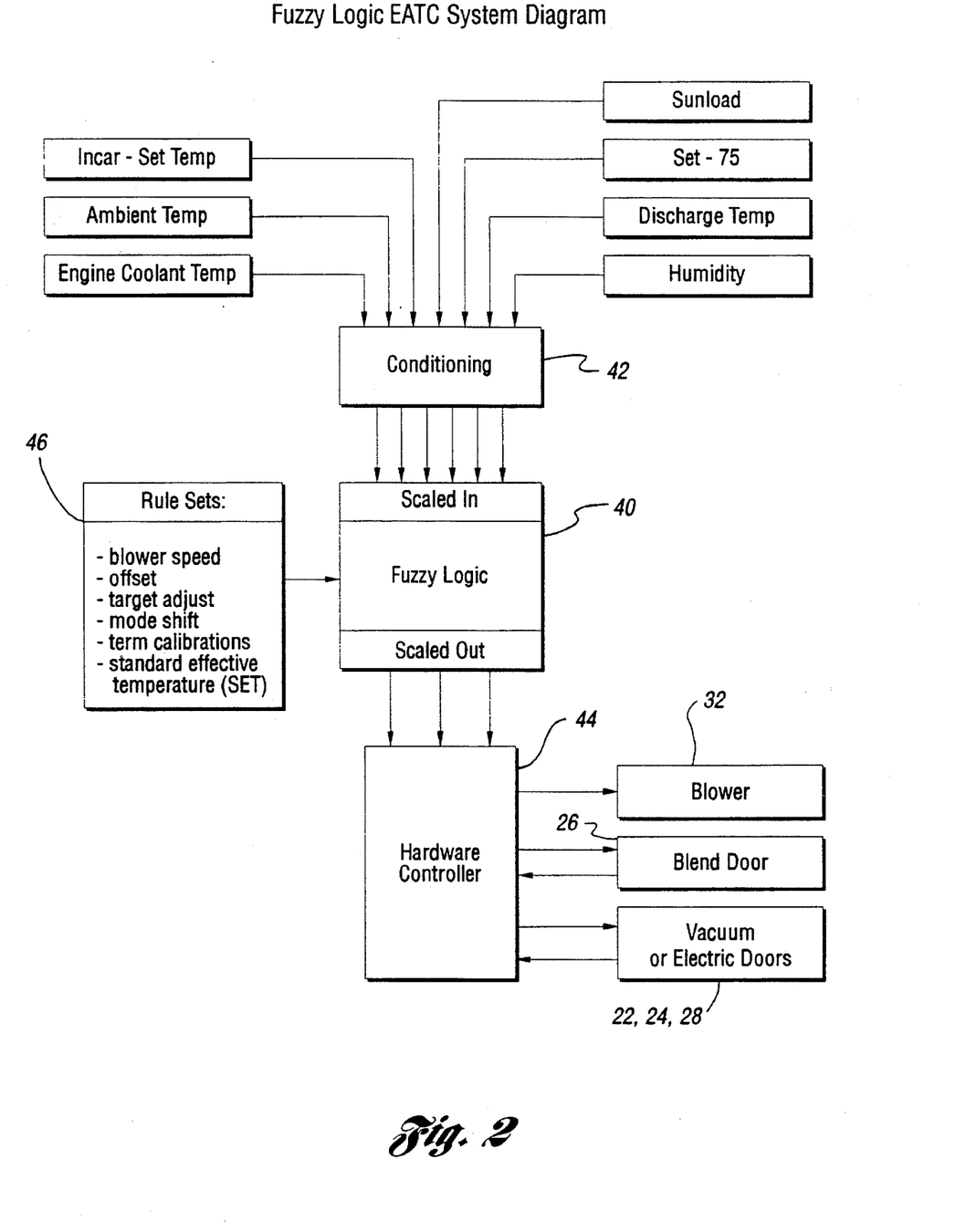
FIG. 2 is a schematic block diagram of the control system of the present invention.

For automatic control of the humidity, temperature and flow of air in the cabin, conditions within and outside the cabin are monitored by sensors and an electronic controller generates signals to control the plant actuators according to the conditions as indicated by the sensors. The evaporator temperature is controlled in a conventional automatic fashion to allow the system to dehumidify air moving thereover. As illustrated in FIG. 2, a typical complement of sensors of the HVAC system provide signals which are representative of in-car temperature, ambient (outside) air temperature, engine coolant temperature (ECT), discharge air temperature, humidity and sunload. In addition, there is a set signal or set temperature value indicating the desired temperature that is set manually by the driver. In turn, an incar-set or target temperature (in-car minus set temperature) signal and a set −75 (set or target temperature minus 75 degrees Fahrenheit) signal are generated or calculated.

The signals are provided to an electronic controller 40 as inputs after being conditioned by a conditioning circuit 42. The controller 40 scales the input signals and provides scaled output signals for use by a hardware controller 44 which, in turn, controls the doors 22 through 28 and the blower 32 to regulate the temperature and flow of air and ultimately to maintain the comfort of driver and passengers in the vehicle.

In the block diagram of the fuzzy logic system of FIG. 2, sensor inputs are conditioned, scaled, and passed to a fuzzy inference engine of the controller 40. Rule sets 46 for the various control functions—blower speed, offset, target set point, mode shift, recirculation/fresh ratio, term calibrations, etc. provide the inference engine with the details of the strategy to be performed. The fuzzy outputs are scaled and passed to the routines to control the motors, actuators, and doors that accomplish the flow and conditioning of the air supplied to the passenger compartment. The rule set basis for control organizes the strategy in a manner that allows easy calibration and adjustment of the control operation.

The fuzzy logic climate controller 40 preferably uses a Motorola 68HC11microprocessor for its calculations. This microprocessor has 512 bytes of RAM and 12 kilobytes of ROM built in. It uses an 8 megahertz clock providing a 500 nanosecond instruction cycle time. An eight channel analog-to-digital converter is integrated into the microprocessor. Five of the eight channels are used to measure inputs that are used by the control system, namely: ambient (outside) temperature, engine coolant temperature, interior temperature, relative humidity and sunload. A further input to the system is the set point temperature which may be adjusted by the vehicle occupants using buttons on the front face of the control unit. The system outputs are: discharge air mode, intake air ratio (fresh air or recirculate), blend door position, and blower speed. The latter three outputs are continuous-valued, the former discrete. The fuzzy logic control calculation takes scaled input values and produces a single relative output value.

The controller 40 is preferably programmed primarily in C and cross-compiled into microprocessor instructions. Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

The method and system of the present invention involves the combination of a humidity sensor and information processing, suitable for use by the EATC (electronic automatic temperature controller) 40. Humidity information from the sensor, in combination with information already available to the EATC 40 (cabin temperature, ambient temperature, blower speed, etc.) allows the calculation of a climate control strategy that takes cabin humidity into account. Humidity is an important variable in occupant comfort, and this strategy should greatly improve occupant comfort for a variety of conditions.

Figure 3:
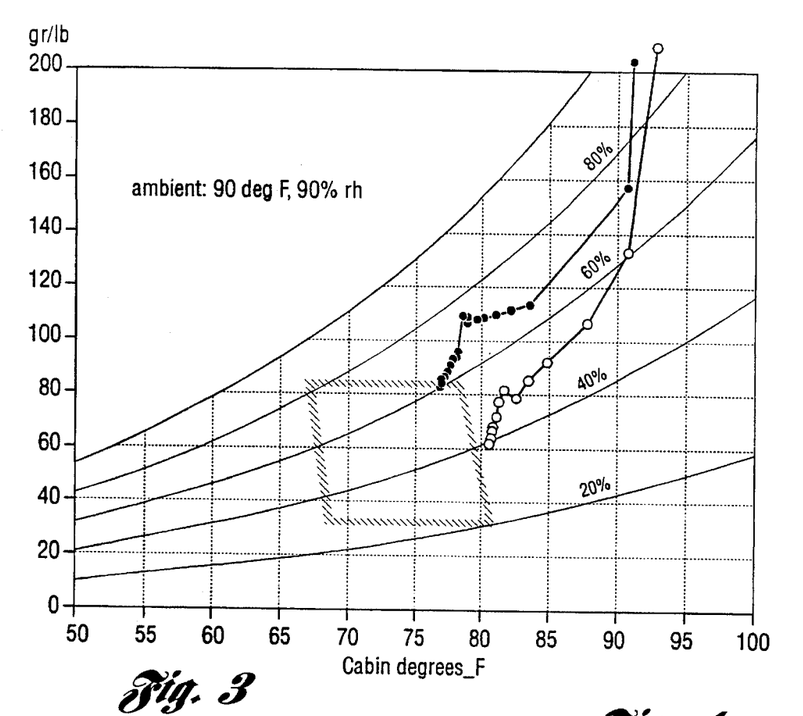
FIG. 3 is a graph illustrating cool down trajectories with (open circles) and without (closed circles) recirculation in a hot and humid ambient as a function of cabin temperature and humidity.

For hot, humid ambient conditions (for example, 90° F., 90% rh), cabin humidity provides key information as to how long to hold the EATC 40 in recirculation mode before changing to (or towards, for continuously variable systems) fresh air. Current strategies often switch out of recirculation mode before comfort has been achieved, as illustrated in FIG. 3 by a parallelogram-shaped comfort zone. Current strategies switches to fresh air mode when a certain temperature is reached. With the method and system of the present invention, recirculation mode (open circles) is maintained longer so that the comfort zone is reached quicker.

Figure 4:
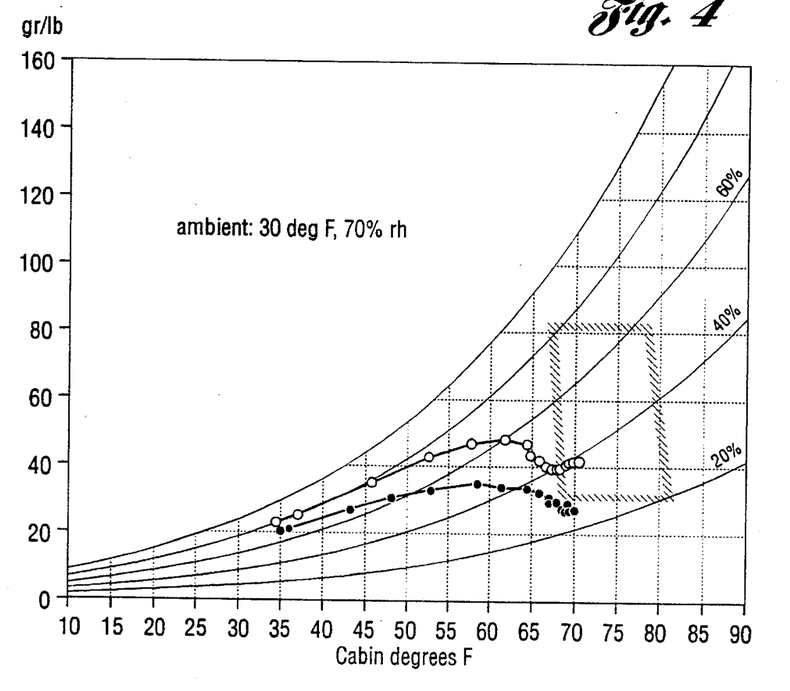
FIG. 4 is a graph illustrating warm up trajectories in a cool and dry ambient with (open circle) and without (closed circle) recirculation as a function of cabin temperature and humidity.
Figure 5:
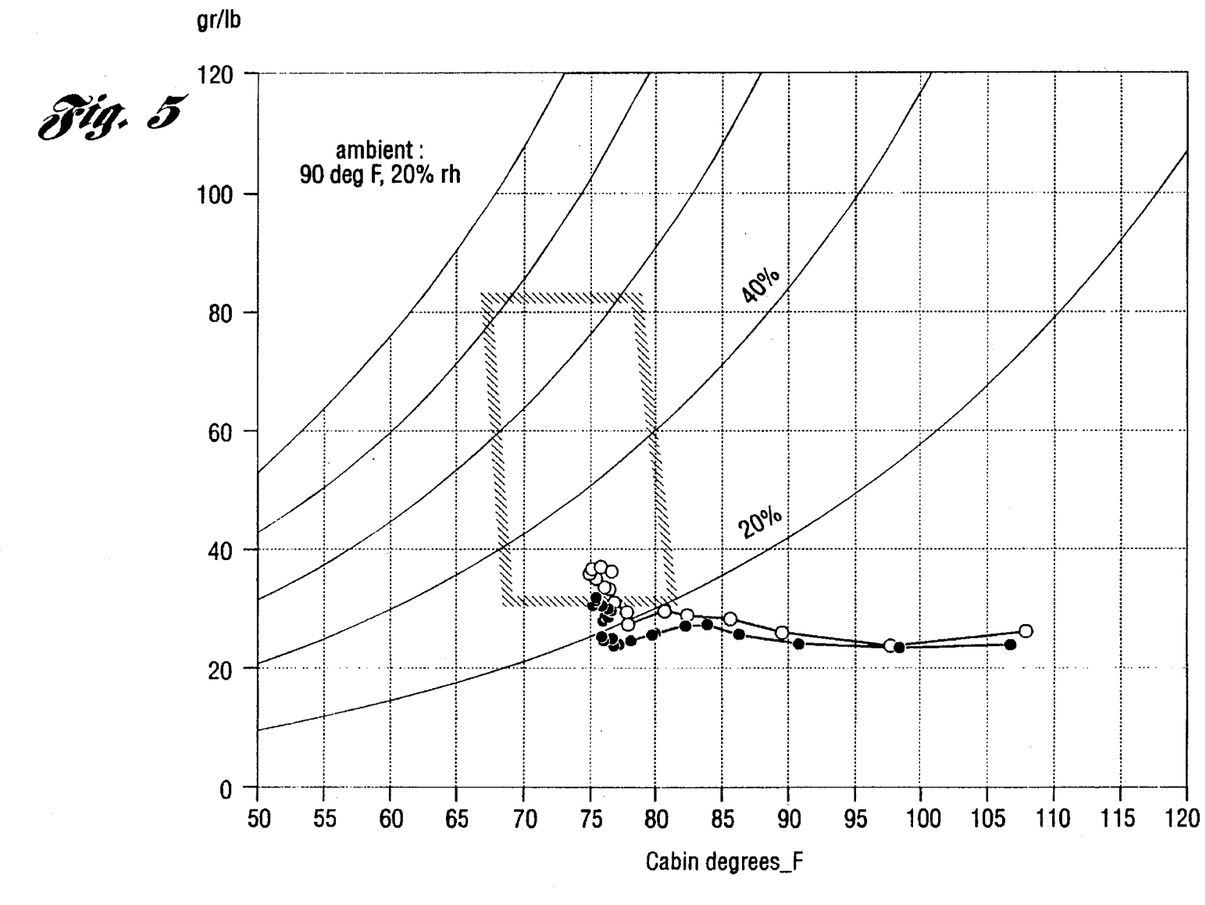
FIG. 5 is a graph illustrating cool down trajectories with (open circles) and without (closed circles) recirculation in a warm and dry ambient as a function of cabin temperature and humidity.
Figure 6A:
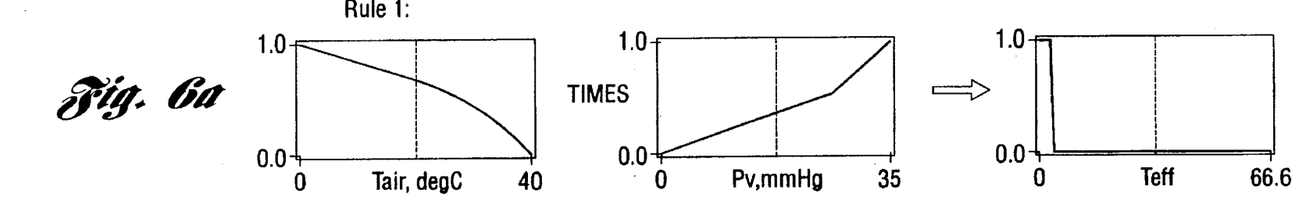
FIGS. 6a through 6d are graphical illustrations of a standard effective temperature (SET) rule set including antecedent and corresponding consequent membership functions.
Figure 6B:
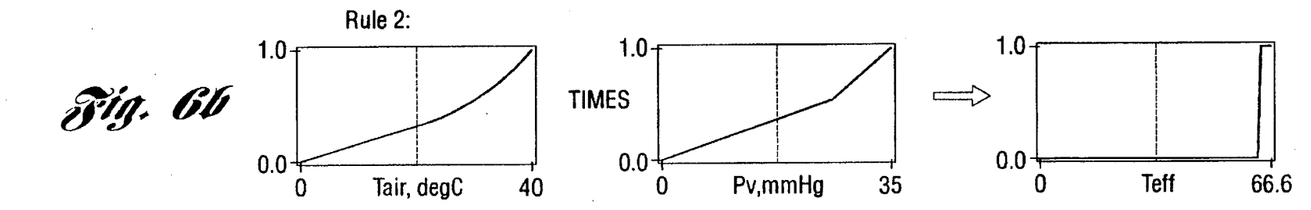
Figure 6C:
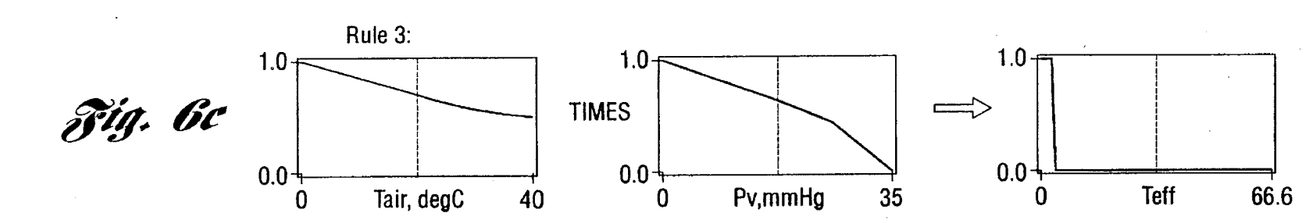
Figure 6D:
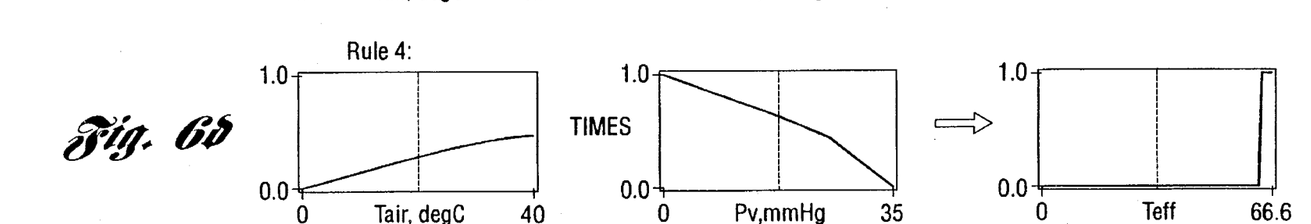

Likewise, for cold ambient warm up, time to comfort may be improved by allowing partial recirculation. FIG. 4 shows the warm up trajectories for full fresh and full recirculation when the ambient temperature is 30° F., and ambient humidity is 70%. The time constant for warm up is improved from 3.3 minutes to 3.0 minutes using the present invention. FIG. 5 shows the cooling trajectories for full fresh and full recirculation when the ambient temperature is 90° F., and the ambient humidity is 20%. The time constant for cool down is improved from 3.1 minutes to 2.5 minutes.

For hot or cold, dry ambient conditions, the current strategy has no way of knowing cabin humidity.

Figure 7:
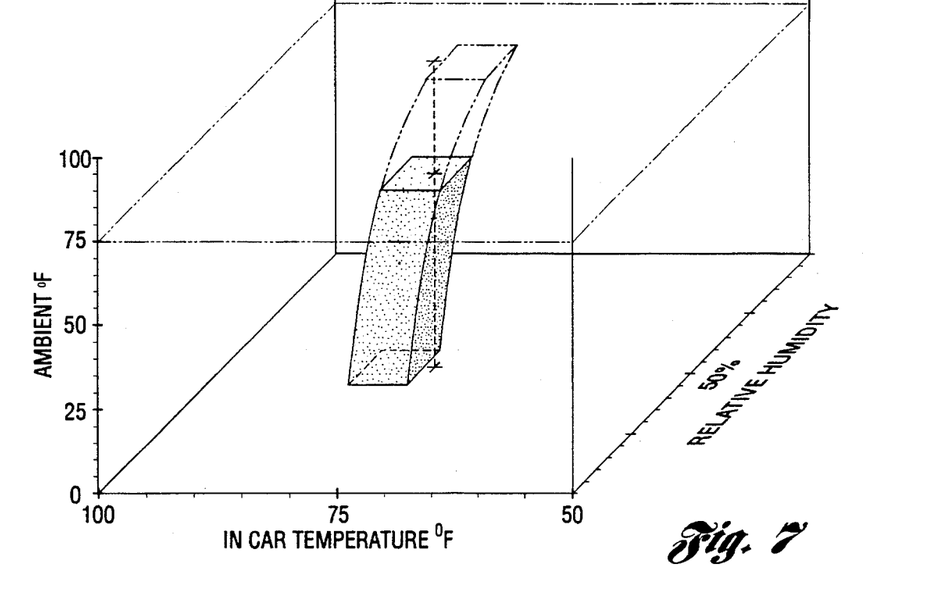
FIG. 7 is a 3-D graph illustrating a comfort window with the inputs of ambient temperature, incar temperature and humidity.

For hot or cold, dry ambient conditions, ASHRAE recommends that r.h. not fall below the 20 to 30 percent r.h. range as the lower comfort limit, as illustrated in FIG. 5. Customers (especially those wearing contact lenses) often complain about such dry conditions. With a humidity sensor to detect overly dry conditions, recirculation is used to increase humidity and achieve greater comfort. Similarly, overly humid conditions should be correctable (this is of less concern, since the evaporator 36 tends to automatically remove excess humidity). FIG. 7 illustrates a 3-D comfort window which the system seeks to achieve with the inputs of ambient temperature, incar temperature and humidity.

Figure 9:
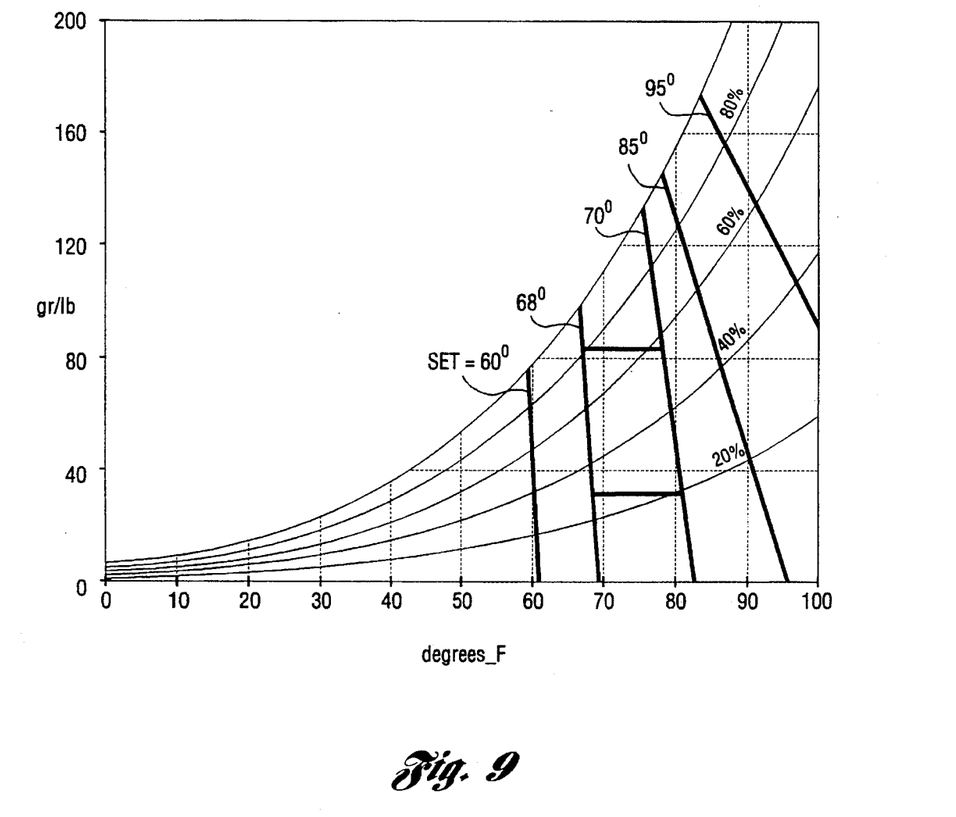
FIG. 9 is a psychometric chart having a graph of standard effective temperature and comfort zone thereon.

Steady state comfort is increased by having target cabin temperature track Standard Effective Temperature (using humidity information to generate that index, as illustrated in FIG. 9). In FIG. 9, absolute humidity is on the vertical axis and relative humidity is dependent on the temperature and is represented by the curved lines. SET is the temperature of an environment at 50% relative humidity that results in the same total heat loss from the skin as in the actual environment. It is useful for adjusting measured cabin temperature to what it feels like.

The combination of full recirculation and high blower speed results in excessive system noise. This may be tolerable for short periods of time in order to get quickly to near-comfort conditions. For systems with partial (continuously variable) recirculation, control based on humidity would allow the system to remain in a partial recirculation condition sufficient (just below a prescribed threshold of noise) but for an extended period of time so as not to compromise customer comfort.

Figure 8:
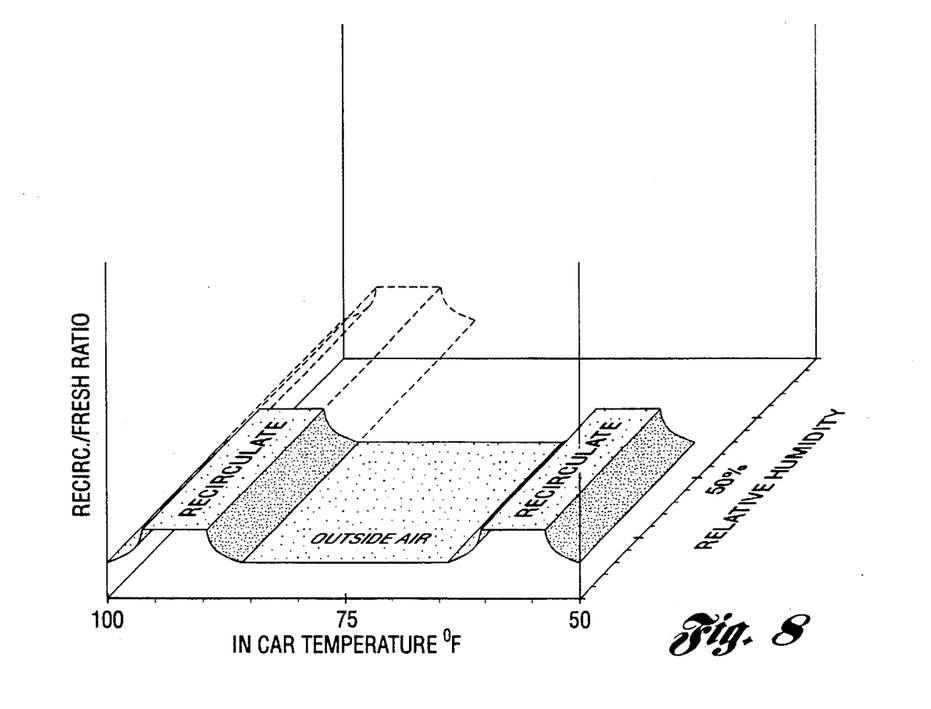
FIG. 8 is a 3-D graph illustrating fuzzy mapping of air recirculation door position using the inputs of incar temperature and humidity.

The strategy for comfort is a complete, standard fuzzy strategy, with the addition of the following rules:

IF Humidity is HIGH, AND Ambient is HIGH, THEN Recirc is HIGH,

IF Humidity is LOW, THEN Recirc is MEDIUM-HIGH,

IF (SET-Target) is ZERO, THEN Recirc is LOW,

IF (SET-Target) IS NOT-ZERO, THEN Recirc is HIGH where Humidity is the measured relative humidity, Recirc is air recirculation door position, and SET is standard effective temperature. In addition, SET is used in place of incar temperature for comparison with the target temperature. SET is preferably mapped by fuzzy functions of incar temperature and absolute humidity, as illustrated in FIGS. 6a through 6d. A similar mapping can be done with temperature and relative humidity. FIG. 8 illustrates fuzzy mapping of air recirculation door position using the inputs of incar temperature and relative humidity.

The use of the present invention in climate control systems strategy results in improved occupant comfort. The ability to tailor gradual, nonlinear response has allowed the design of the strategy to address certain situations that have not been handed gracefully in the past.

New vehicle programs and the requirements of simultaneous-engineering are reducing the time available to develop new automatic climate control strategies. Consequently, the control strategy should be developed at the same time that the HVAC system is being designed. The organization and flexibility of the present invention allow one to develop a set of base rules even before the characteristics of a HVAC system have been finalized.

While the best mode for carrying out the invention has been described in detail, those familiar with the art to which this invention relates will recognize various alternative designs and embodiments for practicing the invention as defined by the following claims.

We claim:

1. A method for automatically controlling a heating, ventilation and air conditioning (HVAC) system for increased comfort of an occupant in a vehicle which discharges a flow of air to a passenger cabin of the vehicle, the system including a variable speed blower, means for varying air temperature, ducting, actuators having various control positions for controlling the direction of air flow, an intake door having varying control positions for controlling the ratio of fresh air to recirculated air, a humidity sensor for sensing relative humidity within the cabin and generating a corresponding humidity signal, and temperature sensors for sensing temperature within the cabin and ambient temperature and an adjustable target temperature, the method comprising the steps of:

determining relative humidity based on the humidity signal;

determining ambient temperature;

determining temperature within the cabin;

determining standard effective temperature based on the humidity signal;

determining the difference between standard effective temperature (SET) within the cabin and the target temperature to obtain a difference sign;

defining membership functions and fuzzy rules between the relative humidity, ambient temperature, the difference signal and the control positions of the intake door; and generating a control signal to control the position of the intake door to cause the system to discharge air into the cabin having a desired ratio of fresh air to recirculated air based on the relative humidity, ambient temperature, the temperature within the cabin, the difference signal, the membership functions and the fuzzy rules.

2. The method as claimed in claim 1 wherein SET is a function of humidity and temperature within the cabin.

3. The method as claimed in claim 2 further comprising the steps of defining membership functions and fuzzy rules between the humidity and temperature within the cabin and the SET.

4. A control system for automatically controlling a heating, ventilation and air conditioning (HVAC) system for increased comfort of an occupant in a vehicle which discharges a flow of air to a passenger cabin of the vehicle, the HVAC system including a variable speed blower, means for varying air temperature, ducting, actuators having various control positions for controlling the direction of air flow, an intake door having control positions for controlling the ratio of fresh air to recirculated air, a humidity sensor for sensing relative humidity within the cabin and generating a corresponding humidity signal, and temperature sensors for sensing temperature within the cabin and ambient temperature and an adjustable target temperature, the system comprising:

means for determining standard effective temperature based on the humidity signal;

means for determining the difference between standard effective temperature within the cabin and the target temperature to obtain a difference signal;

means for defining membership functions and fuzzy rules between the relative humidity, ambient temperature, the difference signal and the control positions of the intake door; and means for generating a control signal to control the position of the intake door to cause the system to discharge air into the cabin having a desired ratio of fresh air to recirculated air based on the relative humidity, ambient temperature, the temperature within the cabin, the difference signal, the membership functions and the fuzzy rules.

5. The system as claimed in claim 4 wherein SET is a function of humidity and temperature within the cabin.

6. The system as claimed in claim 5 further comprising means for defining membership functions and fuzzy rules between the humidity and temperature within the cabin and the SET.

* * * * *